(12) United States Patent
Haumonte et al.

(10) Patent No.: US 10,578,760 B2
(45) Date of Patent: Mar. 3, 2020

(54) CONTROL OF THE HORIZONTAL POSITION OF A SEISMIC CABLE

(71) Applicant: KIETTA, Marseilles (FR)

(72) Inventors: Luc Haumonte, Marseilles (FR); Divine Maalouf, Aubagne (FR); Michel Manin, Sainte Mesme (FR)

(73) Assignee: KIETTA, Marseilles (FR)

( * ) Notice: Subject to any disclaimer, the term of this patent is extended or adjusted under 35 U.S.C. 154(b) by 0 days.

(21) Appl. No.: 15/666,813

(22) Filed: Aug. 2, 2017

(65) Prior Publication Data

US 2018/0038978 A1 Feb. 8, 2018

(30) Foreign Application Priority Data

Aug. 2, 2016 (FR) ...................................... 16 57515

(51) Int. Cl.
*G01V 1/38* (2006.01)

(52) U.S. Cl.
CPC .......... *G01V 1/3817* (2013.01); *G01V 1/3808* (2013.01); *G01V 1/3826* (2013.01); *G01V 1/3843* (2013.01)

(58) Field of Classification Search
CPC .. G01V 1/3808; G01V 1/3843; G01V 1/3826; G01V 1/3817
USPC .......................................................... 367/18
See application file for complete search history.

(56) References Cited

U.S. PATENT DOCUMENTS

| | | | |
|---|---|---|---|
| 3,359,536 A | 12/1967 | Coburn | |
| 3,436,776 A | 4/1969 | Davis | |
| 3,953,827 A | 4/1976 | Le Moal et al. | |
| 4,276,845 A | 7/1981 | Spanner | |
| 4,314,363 A | 2/1982 | Thigpen et al. | |
| 4,372,359 A * | 2/1983 | Hanson ................ | G01V 1/3843 114/244 |
| 4,404,664 A | 9/1983 | Zachariadis | |
| 4,566,083 A | 1/1986 | Thigpen | |
| 4,581,723 A * | 4/1986 | Savit ........................ | G01V 1/38 254/274 |

(Continued)

FOREIGN PATENT DOCUMENTS

DE 102013105593 A1 12/2014
EP 0154968 9/1985

(Continued)

*Primary Examiner* — Daniel L Murphy
(74) *Attorney, Agent, or Firm* — Norton Rose Fulbright US LLP (57) ABSTRACT

The invention in particular relates to a method for controlling the horizontal position of a seismic cable adapted for acquiring seismic data midwater. The method comprises, based on a deviation observed between the position of the seismic cable and a setpoint horizontal position, a correction of the position of the seismic cable through an adjustment of the forces respectively exerted by lead-in cables on the ends of the seismic cable, the exerted forces simultaneously and each having an axial component and a lateral component relative to the seismic cable at at least one moment of the correction.

This allows an easy to implement and relatively precise control of the horizontal position of a seismic cable adapted for acquiring seismic data midwater and kept stationary or quasi-stationary during the data acquisition.

15 Claims, 6 Drawing Sheets

(56) References Cited

U.S. PATENT DOCUMENTS

| | | | |
|---|---|---|---|
| 4,709,355 A * | 11/1987 | Woods | G01V 1/3826 114/245 |
| 4,715,018 A | 12/1987 | Blair | |
| 4,745,583 A | 5/1988 | Motal | |
| 4,870,626 A | 9/1989 | Tveit | |
| 5,144,588 A | 9/1992 | Johnston et al. | |
| 5,166,905 A | 11/1992 | Currie | |
| 5,532,975 A | 7/1996 | Elholm | |
| 5,724,307 A | 3/1998 | Gaiser | |
| 5,774,417 A | 6/1998 | Corrigan et al. | |
| 6,021,090 A | 2/2000 | Gaiser et al. | |
| 6,028,817 A | 2/2000 | Ambs | |
| 6,111,817 A | 8/2000 | Teeter | |
| 6,205,403 B1 | 3/2001 | Gaiser et al. | |
| 6,230,840 B1 | 5/2001 | Ambs | |
| 6,256,090 B1 * | 7/2001 | Chen | G01B 11/18 250/227.14 |
| 6,285,956 B1 | 9/2001 | Bennett et al. | |
| 6,456,565 B1 | 9/2002 | Grall et al. | |
| 6,474,254 B1 | 11/2002 | Ambs et al. | |
| 6,590,831 B1 | 7/2003 | Bennett et al. | |
| 6,681,710 B2 | 1/2004 | Semb | |
| 6,932,185 B2 | 8/2005 | Bary et al. | |
| 7,112,111 B1 | 9/2006 | King | |
| 7,203,599 B1 | 4/2007 | Strack et al. | |
| 7,239,577 B2 | 7/2007 | Tenghamn et al. | |
| 7,411,863 B2 | 8/2008 | Toennessen | |
| 7,446,535 B1 | 11/2008 | Tenghamn et al. | |
| 7,742,876 B2 | 6/2010 | Robertsson | |
| 7,898,904 B2 | 3/2011 | Arnegaard et al. | |
| 7,933,163 B2 | 4/2011 | Fossum et al. | |
| 7,965,583 B2 | 6/2011 | Thomas | |
| 8,064,286 B2 | 11/2011 | Ronnekleiv et al. | |
| 8,416,640 B2 | 4/2013 | Fleure et al. | |
| 8,570,829 B2 | 10/2013 | Hovland et al. | |
| 8,576,658 B2 | 11/2013 | Thomas | |
| 2002/0172562 A1 | 11/2002 | Worman et al. | |
| 2004/0042341 A1 | 3/2004 | Tenghamn et al. | |
| 2004/0049347 A1 | 3/2004 | Fookes et al. | |
| 2005/0052951 A1 | 3/2005 | Ray et al. | |
| 2005/0128874 A1 | 6/2005 | Herkenhoff et al. | |
| 2006/0155758 A1 | 7/2006 | Arnegaard et al. | |
| 2006/0215490 A1 | 9/2006 | Tenghamn et al. | |
| 2006/0256652 A1 | 11/2006 | Thomas | |
| 2007/0064528 A1 | 3/2007 | Metzbower et al. | |
| 2007/0070808 A1 | 3/2007 | Ray et al. | |
| 2007/0223306 A1 | 9/2007 | Toennessen | |
| 2008/0010022 A1 | 1/2008 | Robertsson | |
| 2008/0019214 A1 | 1/2008 | Pramik | |
| 2008/0074946 A1 | 3/2008 | Hillesund et al. | |
| 2009/0046536 A1 | 2/2009 | Kinkead | |
| 2009/0316524 A1 | 12/2009 | Tenghamn | |
| 2009/0316526 A1 | 12/2009 | Grall | |
| 2010/0054079 A1 | 3/2010 | Thompson et al. | |
| 2010/0226204 A1 | 9/2010 | Gagliardi et al. | |
| 2010/0265793 A1 | 10/2010 | Fleure et al. | |
| 2011/0017118 A1 | 1/2011 | Jean-Paul | |
| 2011/0149682 A1 | 6/2011 | Martin et al. | |
| 2011/0176383 A1 | 7/2011 | Jewell | |
| 2011/0283797 A1 | 11/2011 | Manin | |
| 2011/0291658 A1 | 12/2011 | Skogman et al. | |
| 2012/0224453 A1 | 9/2012 | Wu | |
| 2012/0287753 A1 | 11/2012 | Hatchell et al. | |
| 2013/0201790 A1 * | 8/2013 | Manin | G01V 1/3808 367/16 |
| 2014/0046599 A1 | 2/2014 | Smith et al. | |
| 2014/0198607 A1 | 7/2014 | Etienne et al. | |
| 2014/0204708 A1 | 7/2014 | Muijzert et al. | |
| 2014/0233351 A1 | 8/2014 | Gerze | |
| 2014/0254315 A1 | 9/2014 | Rigsby et al. | |
| 2015/0016218 A1 | 1/2015 | Welker et al. | |
| 2015/0063064 A1 | 3/2015 | van Groenestjin | |

FOREIGN PATENT DOCUMENTS

| | | |
|---|---|---|
| EP | 884607 | 12/1998 |
| EP | 1047958 | 11/2000 |
| FR | 1561077 A | 3/1969 |
| FR | 2795527 A1 | 12/2000 |
| FR | 2870509 | 11/2005 |
| FR | 2940838 A1 | 7/2010 |
| FR | 2945356 A1 | 11/2010 |
| FR | 2961317 A1 | 12/2011 |
| FR | 2990028 A1 | 11/2013 |
| GB | 2414804 A | 12/2005 |
| GB | 2435931 A | 9/2007 |
| GB | 2517756 A | 3/2015 |
| WO | 99/01338 | 1/1999 |
| WO | 00/67046 A1 | 11/2000 |
| WO | 01/79890 A1 | 10/2001 |
| WO | 02/073238 A2 | 9/2002 |
| WO | 2007/070499 A2 | 6/2007 |
| WO | 2010/076646 A1 | 7/2010 |
| WO | 2011/154545 | 12/2011 |
| WO | 20140176239 A1 | 10/2014 |

* cited by examiner

CONTROL OF THE HORIZONTAL POSITION OF A SEISMIC CABLE

FIELD OF THE INVENTION

The present invention relates to the field of seismic prospecting in aquatic mediums (sea or lake).

BACKGROUND

Seismic prospecting in aquatic mediums is conventionally performed by placing a set of parallel submerged seismic cables carrying a plurality of sensors (hydrophones or hydrophone/geophone combinations) spaced apart along the cable, the set of cables being towed by a seismic vessel. A source capable of creating an acoustic wave in the medium, generally in the form of an array of air guns, is towed by the seismic vessel at a distance from the seismic cables. The wave thus formed propagates to the water bottom, then further to the underlying subsoil, which gives rise to reflections at the interfaces between the geological layers forming the subsoil, which are collected by said submerged sensors. All of the information is then processed to produce a three-dimensional (3D) image of the different geological layers of the subsoil, generally used to determine the presence of hydrocarbon reservoirs.

Document FR2940838A1 discloses a seismic prospecting technique in which a set of parallel submerged seismic cables of neutral buoyancy are positioned midwater, and each cable is connected to respective surface autonomous recording vessels (hereinafter "RAVs"), sometimes called "RAVs", at each of its two ends and subject to a tension exerted at its ends by the RAVs in opposite directions, so that the cables can be kept stationary or quasi-stationary during the acquisition of seismic signals. Various aspects related to this technique have been disclosed in FR2945356A1, FR2961317A1 and FR2990028A1.

The technique disclosed in document FR2940838A1 provides, in addition to other advantages presented in this document, great flexibility in the positioning of the seismic cables as compared with the conventional method in which the entire set of cables is towed by a seismic vessel; it enables in particular the cables to be positioned at a water depth much greater than the depth in the range of 5 to 15 meters which is a constraint of the aforementioned conventional method.

The present invention relates to a method that is easy to implement and improves the precision of the control of the position in a horizontal plane, i.e., a plane perpendicular to the vertical in the terrestrian reference base (hereinafter "horizontal position") of a seismic cable adapted for acquiring seismic data midwater and kept stationary or quasi-stationary during the data acquisition.

BRIEF DESCRIPTION OF THE INVENTION

A method is provided for controlling the horizontal position of a seismic cable adapted for acquiring seismic data midwater, each end of the seismic cable being connected to a respective autonomous surface vessel that exerts a force on said end, such that the seismic cable can be kept stationary or quasi-stationary during the data acquisition through application of forces in opposite directions by the surface vessels on the ends of the cable to which they are respectively connected, the seismic cable being connected to the surface vessels via respective negative buoyancy lead-in cables. The method comprises, based on a deviation observed between the position of the seismic cable and a setpoint horizontal position, a correction of the position of the seismic cable through an adjustment of the forces respectively exerted by the lead-in cables on the ends of the seismic cable, the exerted forces having simultaneously and each an axial component and a lateral component relative to the seismic cable at at least one moment of the correction. The adjustment of the forces depends on at least one measurement of the tension at the two ends of the seismic cable and the direction of the seismic cable at least substantially at the two ends of the seismic cable.

According to various examples, the method may comprise one or more of the following features in combination.

the deviation observed between the position of the seismic cable and the setpoint horizontal position comprises a series of one or several deviation values, the adjustment of the forces comprising a series of commands of one or several setpoint pairs of forces to be exerted respectively by the lead-in cables on the ends of the seismic cable, each setpoint pair of forces command depending on a corresponding respective deviation value;

each setpoint pair of forces command comprises a feedback loop using, as input, at least one measurement of the tension at the two ends of the seismic cable and the direction of the seismic cable at least substantially at the two ends of the seismic cable;

the tension measurement is provided by a tensiometer and/or the measurement of the direction of the seismic cable is provided by a compass;

the feedback loop of each setpoint pair of forces command receives a contribution of a set of several components of the corresponding respective deviation value, the contribution of a component of the set being independent of the contributions of the other components;

the set of several components comprises an in-line component, a transverse component, a curvature component, and a direction component;

the contribution of each component to the setpoint pair of forces in the feedback loop is adaptive; and/or the adaptation of the contribution of a component to the setpoint pair of forces in the feedback loop depends on the value of the component, the determined and/or predicted value of the current, a maximum stress value, an energy minimization criterion, and/or a criterion defined by a user.

Also provided is a method for controlling the horizontal position of an array of seismic cables adapted for acquiring seismic data midwater, each end of each seismic cable being connected to a respective autonomous surface vessel that exerts a force on said end, such that the seismic cable can be kept stationary or quasi-stationary during the data acquisition, the seismic cable being connected to the surface vessels via a respective negative buoyancy lead-in cable. The method for controlling the horizontal position of the array comprises controlling the horizontal position of at least one of the seismic cables of the array using the above method. In examples, the method may comprise controlling the horizontal position of at least one other seismic cable of the array by maintaining a fixed distance relative to the at least one of the seismic cables of the array.

Different devices are further provided.

A computer program is further provided that comprises instructions for carrying out any one or several of the above methods. The computer program may be recorded on a data storage medium that forms a device. The computer program comprises program code instructions for executing steps of the method when said program is executed on a computer. The computer controls, for a seismic cable adapted for acquiring seismic data midwater, each end of the seismic cable being connected to a respective autonomous surface vessel that exerts a force on said end, such that the seismic cable can be kept stationary or quasi-stationary during the data acquisition, the seismic cable being connected to the surface vessels via a respective negative buoyancy lead-in cable, the forces respectively exerted by the lead-in cables on the ends of the seismic cable.

A control unit is further provided as a device comprising a computer and able to control, for a seismic cable adapted for acquiring seismic data midwater, each end of the seismic cable being connected to a respective autonomous surface vessel that exerts a force on said end, such that the seismic cable can be kept stationary or quasi-stationary during the data acquisition, the seismic cable being connected to the surface vessels via a respective negative buoyancy lead-in cable, forces respectively exerted by the lead-in cables on the ends of the seismic cable, the control unit comprising a processor in communication with a memory or data storage medium having stored the aforementioned computer program (e.g. and belong to the control unit as well).

Different systems are further provided.

A seismic cable is provided as a system adapted for acquiring seismic data midwater, each end of the seismic cable being adapted for being connected to a respective autonomous surface vessel that exerts a force on said end, such that the seismic cable can be kept stationary or quasi-stationary during the data acquisition, the seismic cable being connected to the surface vessels via a respective negative buoyancy lead-in cable, the seismic cable being configured to control the horizontal position using the above method. The seismic cable may, in examples, comprise a tensiometer and/or a compass at each end of the seismic cable.

A seismic cable float is further provided as a system comprising at least one such seismic cable.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

The method for controlling the horizontal position of a seismic cable can be integrated to a global process for seismic prospection with a seismic acquisition system that comprises a set (or array) of (at least one or two, or strictly more than three) seismic cables each configured for data acquisition.

The overall method may comprise controlling the horizontal position of at least one of the seismic cables of the array according to this method, then called "master" cable (s), for example all of the seismic cables of the array, or alternatively, only one or several cable(s) of the array. In the latter case, the control of the horizontal position of at least one other seismic cable of the array (for example, all of the other seismic cables of the array), called "slave" cable(s), can be done relative to one or several master seismic cable(s), for example by maintaining a fixed distance relative to the sole master seismic cable, from a respective one of the several master cables, or by maintaining a relative position with respect to the several master seismic cables.

For example, the array may comprise N seismic cables, including k masters and N-k slaves, with $1<=k<=N$ (knowing that in the case k=N, each seismic cable is an independent master). In a collaborative mode, the process may comprise a global command for all of the seismic cables. To calculate errors, the process may comprise a single target point for the array or individual target points by seismic cable. The process may also implement a division of the array into several sub-arrays, each sub-array being able to have a different central target point.

Throughout the process, the system is deployed in an aquatic medium (i.e., sea or lake), and for data acquisition, one or more seismic sources, which can be impulsive sources (for example in the form of an array of air guns or marine vibrators, towed by a respective vehicle or boat) periodically or continuously create a wave in the aquatic medium, whose reflection(s) at interfaces between geological layers underneath the sea bottom are collected by the seismic sensors carried by the cables of the system (e.g., as described in FR2990028A1). The data thereby acquired can then be processed to produce a 3D image of the reservoir. Throughout the process, the cables of the contemplated set are kept midwater suitably at a depth superior to 5 meters and which can reach 100 meters or slightly more. The depth is determined so as to meet the set of specific data quality requirements pertaining to the zone to be prospected. Each cable includes seismic sensors (suitably hydrophone and possibly geophone) spaced apart along the cable. Throughout the process, the cables are arranged laterally aligned (one with respect to another), so as to form a 2D horizontal array of sensors and thereby provide adequate coverage of the zone to be prospected. The cables may be maintained parallel one to another (e.g., as much as possible, with respect to other constraints).

Furthermore, any combination of at least one of the cables of the system (for example, all the cables of the system) may also respect any or a combination of the following requirements.

The system enables the cables to be maintained during acquisition in a stationary or pseudo-stationary manner either relative to the aquatic medium, or relative to the bottom of the water (i.e., thus relative to the terrestrial referential). The seismic cables can thus be referred to as by the acronym "MSC", as in "Midwater Stationary Cable". This can be performed according to FR2940838A1, which is incorporated herein by reference (notably regarding such positioning of the cable). While maintaining a stationary or pseudo-stationary position, the movement of the cable may also be restricted by a maximum track curvature value in the water, as described in FR2961317A1, which is incorporated herein by reference (notably regarding the definition and/or value of said maximum track curvature value in the water and/or how to respect such constraint). This allows relatively low mechanical and energy constraints.

Figure 3:
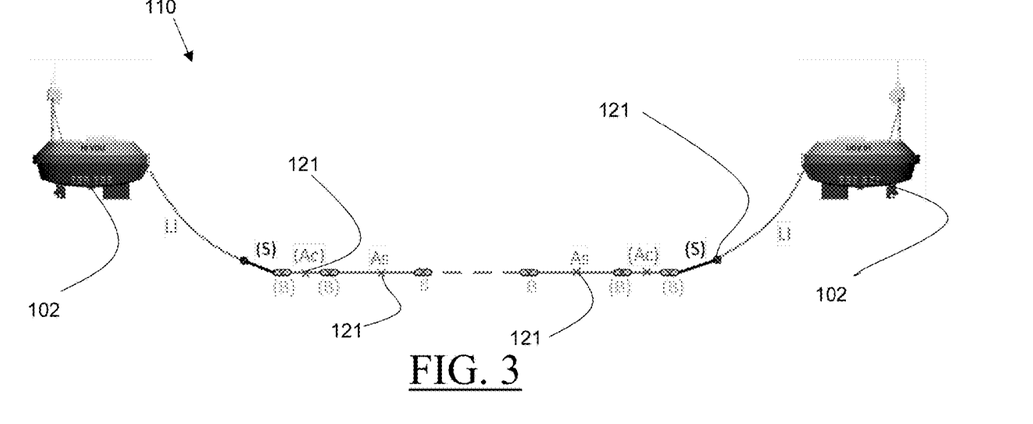
FIG. 3 shows an example seismic cable.

Both end(s) of the cable are connected to respective surface vessels (for example aforementioned RAVs) through respective lead-in cables, as shown by FIG. 3. The RAVs are adapted to control position of the cable by exerting tension at its ends through the lead-in cables. In such a context, the two RAVs allow a prompt compensation of the current any time, even in case of quickly changing currents. Furthermore, owing to the speeds at stake (for usual sea currents), the RAVs can be relatively small in terms of size and/or mechanical capacities (relative to conventional seismic vessels). The RAVs may for example have a length inferior to 20 meters or 12 meters (e.g. about 8 meters), a width inferior to 15 meters or 10 meters (e.g. about 6 meters), and a height—excluding a mast—inferior to 12 meters or 8 meters (e.g. about 4.5 meters) and each RAV is mechanically adapted for pulling the cable at any speed up to a predetermined maximum speed—relative to the water which can be equal to 5 knots (about 9.26 km/h). As stated above, the system enables the seismic cables to be kept stationary or quasi-stationary, which implies a speed in the range of 0 to 2 knots relative to the water medium, but it also enables the cables to be moved at greater speeds, as adapted for displacements between acquisition stations or for transit to a zone to be prospected or to meet specific operational requirements. The seismic cables may have a length superior to 1 km, or superior to 4 km, for example about 8 km. The seismic cables have a weight (in the air) of typically about 2700 kg/km and are neutrally buoyant in water, as mentioned above. The lead-in cables have a weight (in the air) of typically about 3300 kg/km and have a negative buoyancy in water.

Variable buoyancy ballasts may be installed at intervals along the seismic cable of e.g. 250 meters. The ballasts can be as described in FR2945356A1, which is incorporated herein by reference (notably regarding how such ballasts work). The ballasts may be configured to ensure that at any time the buoyancy error of the cable (i.e. the ratio between the optimal weight of the cable to reach a zero buoyancy and the real weight of the cable) is substantially always inferior to e.g. 1%.

Figure 1:
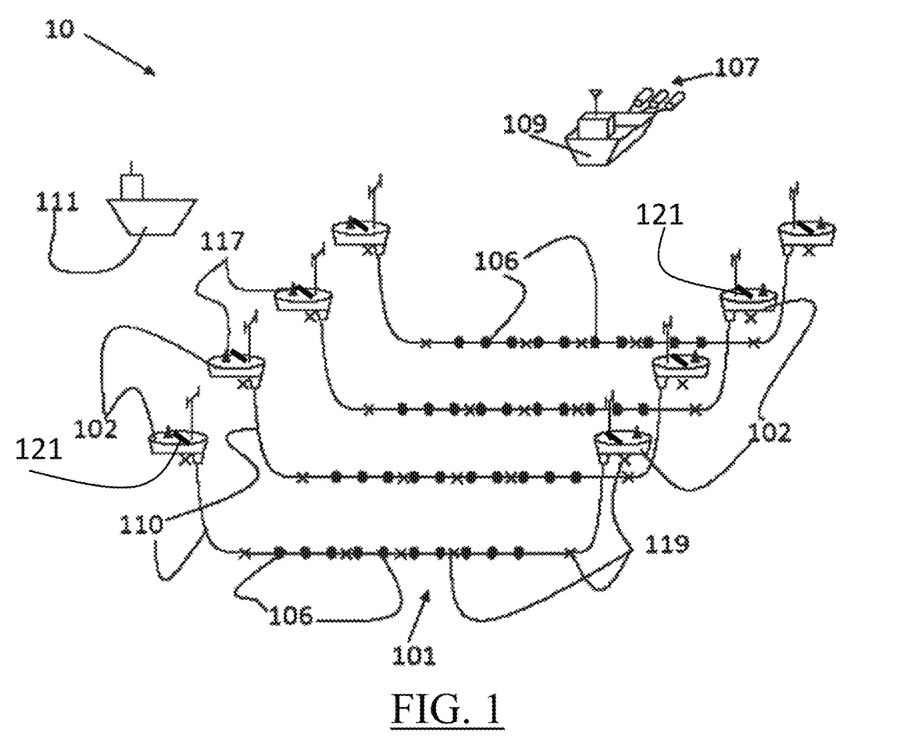
FIG. 1 shows a perspective view of a seismic acquisition system.

FIG. 1 shows a perspective view of an example 10 of such a marine seismic acquisition system. The system 10 comprises a set or array 101 of parallel seismic cables 110, each in accordance with the above explanations, thereby forming an array of floating cables to acquire seismic signals (receivers), and a seismic source 107 towed by a source boat 109 (i.e., shooting vessel to generate seismic source). In the illustrated example, each cable 110 is connected at its ends to independent RAVs 102 adapted for exerting respective forces on cable 110 in opposite directions, the cable being thereby able to be maintained in a stationary or pseudo-stationary position when the forces exerted by the RAVs at the ends of the cable along its axis are of equal or substantially equal magnitude. To achieve the displacement of the cable from an acquisition zone to another, the forces exerted by the RAVs may be adjusted in such a way that the drone connected to the head of the cable tows it and the one at the tail of the cable exerts a much lower force than the head drone, just enough to maintain a tension in the cable. The cable is connected to the RAV via respective winches 121 which incorporate such a control unit. The RAVs 102 thereby position receiving cables and control the array geometry. The control unit is a system comprising a processor coupled to a random-access memory, and implementing a program comprising instructions for controlling the speed of the cable 110. The set 101 of cables 110 is provided with a plurality of sensors/receivers 106 (suitably hydrophone/geophone combinations) capable of collecting said reflected waves. Such a cable 110 may be called a "seismic cable". The cables 110 evolve in an acquisition station adapted to prospect part of the aforementioned area of the subsoil. The seismic source 107 is triggered. The receivers 106 are used to pick up the reflected waves. It is then possible to operate the RAVs 102 to move the cables 110 to another measuring station adapted to prospect another part of the aforementioned area, and to move the seismic source 107 as well, and so forth. The cables 110 have a neutral buoyancy and are submerged at a depth (i.e., the distance relative to the surface of the water, which surface is not represented on the figure) as defined hereinabove. Each of the cables 110 is suitably provided with ballast-forming elements 119 designed to keep the cable 110 at the desired weight in the water so as to be neutrally buoyant. The ballasts 119 allow the cables 110 to be kept at substantially constant depth and to vary it in a controlled manner. Each of the cables 110 is also provided at both ends thereof with surface RAVs 102 in the example, capable of moving the cables 110 and keeping each cable 110 under tension. The master vessel 111 coordinates overall operations and communicates with the RAVS 102 via antenna 117 provided on an RAV 102.

The positioning of the cables, the source, and/or the control of the ballasts and/or the source may be performed automatically or semi-automatically (e.g. involving to some extent human specialists on-land or on-board e.g. the vehicle towing the source or any nearby vessel via computer program(s) embedded in one or more control units that may receive signals from and/or send signals to any element of the system to which such control unit is coupled (e.g. via radio link for surface communications and physical—e.g. electrical—cable connection for underwater communications). Such control unit(s) may be embedded within any vehicle (e.g. the vehicle towing the source or any nearby vehicle) and/or the RAVs, and/or any other element of any cable for which control is needed.

Figure 2:
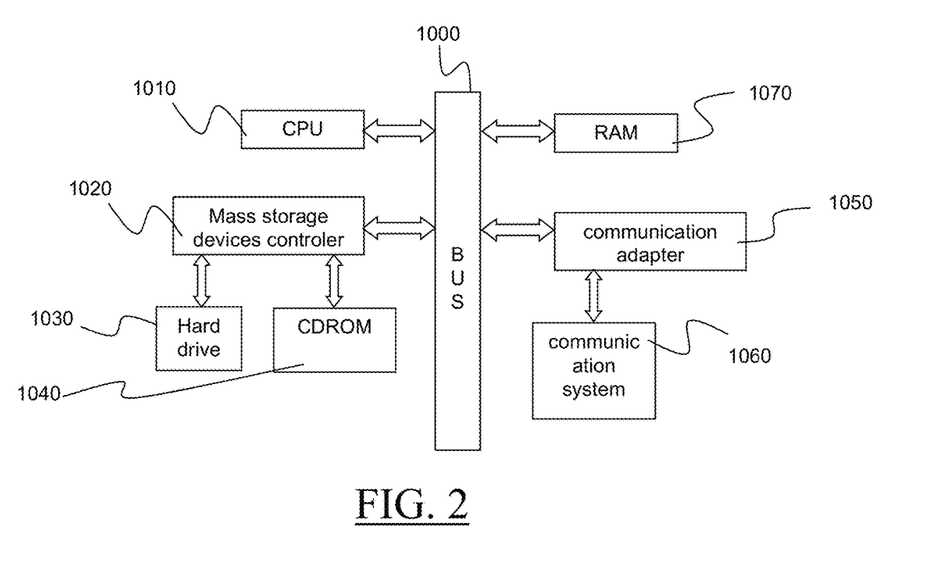
FIG. 2 shows a schematic representation of an example control unit.

FIG. 2 shows an example of such a control unit, embodied as a standard computing system. The control unit of the example comprises a central processing unit (CPU) 1010 connected to an internal communication BUS 1000, a random access memory (RAM) 1070 also connected to the BUS. A mass storage device controller 1020 manages accesses to a mass memory device, such as hard drive 1030. Mass memory devices adapted for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A communication adapter 1050 manages accesses to a communication system 1060 (e.g., radio communication system).

The computer program may comprise instructions executable by a computer, the instructions comprising means for causing the source, the seismic cables and/or any other components of the seismic prospecting system to perform any of the methods described herein. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the control unit results in any case in instructions for performing the method steps.

An example MSC is represented on FIG. 3. The example MSC (e.g., typically 8-kilometer long) is connected to RAVs 102 via lead-in cables L1 and the system is composed of:

- two lead-in cables L1 of 400 m (generally longer than 100 or 200 m and/or shorter than 800 or 600 m) terminated by a cable head (one at each side),
- two stretch sections S to damp shocks and vibrations coming from sea surface (one at each side),
- two acoustic sections Ac equipped with compass and acoustic units (one on each side),
- one seismic cable 110 made of 250-meter long active sections including seismic receivers each comprising a hydrophone and a three-axis geophone every 25 m (generally every x meters with x fixed or varying and higher than 5 or 15 m and/or lower than 100 or 35 m),
- auxiliary equipment installed on the cable (appurtenances):
  - cable ballasts B every 250 m (generally every y meters with y fixed or varying and higher than 100 or 200 m and/or lower than 500 or 300 m) between each active section As,
  - acoustic positioning units, depth sensors 123 and compass every 250 m (generally every z meters with z fixed or varying and higher than 100 or 200 m and/or lower than 500 or 300 m) in the middle of each active section (to precisely locate sensors).

In the example, depth meters are present in the cable heads, in each ballast, and in the middle of the active sections and of the acoustic sections. Tension meters are present in the cable heads and in the ballasts. Stretch sections and acoustic sections may or may not be used—depending on the type of deployment chosen.

Examples of lead-in cable characteristics that can be implemented include:

- outside diameter: higher than 10 mm and/or lower than 50 mm (e.g., 30 mm),
- weight in air: higher than 1 kg/m and/or lower than 5 kg/m (e.g., 3 kg/m),
- weight in water: higher than 0.5 kg/m and/or lower than 4 kg/m (e.g. 2 kg/m).

Examples of seismic section characteristics that can be implemented include:

- outside diameter: higher than 20 mm and/or lower than 100 mm (e.g., 60 mm),
- weight in air: higher than 1 kg/m and/or lower than 5 kg/m (e.g., 3 kg/m),
- weight in water: substantially 0 kg/m (nominal).

Figure 4:
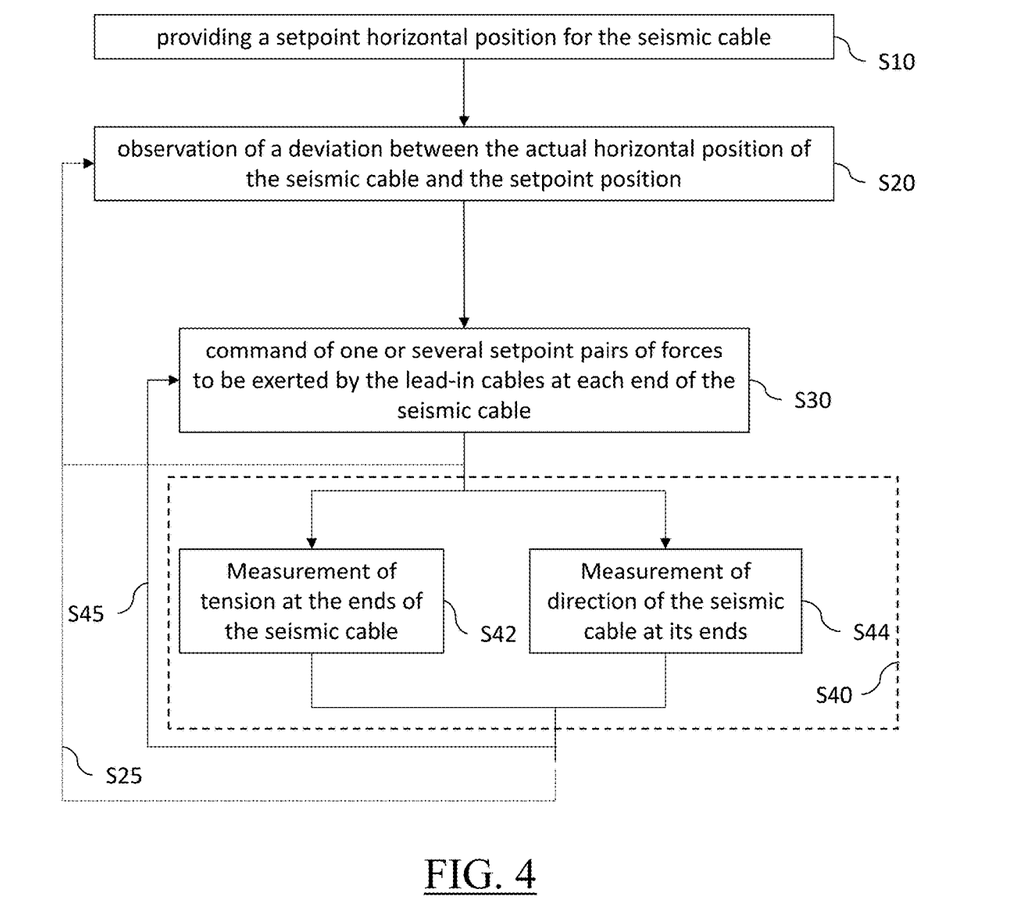
FIG. 4 shows an example of the method.

The method for controlling the horizontal position of a seismic cable (for example, a master cable) is now described in more detail in reference to an example shown by FIG. 4.

The method of the example allows simple and relatively precise control of the horizontal position of a seismic cable adapted for acquiring seismic data midwater, for example as described above. The vertical position (i.e., the depth) of the cable can be controlled by any means, for example independently. This depth control is not described here.

Each end of the seismic cable is connected to a RAV that autonomously and potentially simultaneously exerts a force on said end via a respective negative buoyancy lead-in cable. The RAV exerts the force on said end by pulling the respective lead-in cable on said end. The force may therefore have a variable direction and intensity. This variation in the force exerted by the RAV on said end may be done by controlling the propulsion of the RAV in the water and/or the winding/deployment of the lead-in cable on board the RAV, for example by a winch mounted on board the RAV and controlling said winding/deployment of the lead-in cable.

The forces exerted at the end of the seismic cable are configured to keep the cable stretched, substantially throughout the data acquisition. The method may for example comprise phases where the two RAVs each and simultaneously tow the seismic cable to keep it stretched and in the stationary or quasi-stationary position (in a horizontal and/or vertical plane) during the data acquisition, as set out above. Thus, the method may comprise exerting forces at the ends of the seismic cable configured to keep the cable, substantially throughout the data acquisition, stretched and stationary or quasi-stationary, in particular according to the current. The method may for example compensate the current.

To determine these forces to be exerted at the ends of the seismic cable, the method of the example of FIG. 4 comprises providing S10 a setpoint horizontal position for the seismic cable. The setpoint is provided in S10 for example to the unit controlling the position of the seismic cable set out above, according to any data format supported by the control unit. The setpoint horizontal position may be a fixed horizontal position value (for example, coordinates x and y) for a point of the seismic cable (for example, its midpoint) or a plurality of points of the seismic cable (for example, including its extreme points and its midpoint), or a series of such value(s) as a function of time. This last case makes it possible to define a setpoint trajectory, the trajectory respecting the stationary or quasi-stationary position condition during the data acquisition. In the first case, the method of FIG. 4 can be repeated, such a repetition being able to have a result equivalent to the second case.

The method of the example of FIG. 4 also comprises the observation S20 at a moment of a deviation between the actual horizontal position of the seismic cable (as observed) and the setpoint position provided in S10 for that moment. The observation S20 may comprise a determination of the actual horizontal position of the seismic cable including a measurement, then a calculation of the deviation. The actual position may have the same format as the setpoint position (i.e., one or several positioned points of the seismic cable) or a different format. The deviation may be calculated in any manner. For example, if the actual position is determined in S20 as the position of a single point of the seismic cable at a given moment, then the deviation can be the distance between the actual position and the setpoint position provided in S10 for this given moment. If the actual position is determined in S20 as the position for a set of several points, then a deviation accounting for several point-to-point distances can be calculated (for example, a sum of least squares).

The actual position can be determined using any means, for example including measurements. For example, the observation S20 may comprise the determination of the actual horizontal position of the seismic cable owing to GPS data measurements for reference points on the surface, for example the RAVs, and/or compass data measurements providing the direction of different segments of the seismic cable and/or lead-in cables. The directions of the cable segments can be integrated (i.e., accumulated), and thus provide the position of each cable segment. This allows a fast observation S20, and thus as real-time, and therefore relatively precise, an execution of the method as possible. In one example, acoustic data measurements can make it possible to validate the compass measurements periodically.

The method of FIG. 4 may comprise repetitions S25 of step S20 to correct the deviation between the actual position and setpoint position. Thus, at substantially any moment of the method (for example, at predetermined, which is to say regular, time pitches), a new observation S20 can be initiated to reduce the deviation. Any repetition frequency may be adopted. This results in an observed deviation between the position of the seismic cable and the setpoint horizontal position that comprises a series of several deviation values, and thus a series of corrections of this deviation.

Upon each observation S20, the method of the example comprises the correction of the position of the seismic cable through an adjustment of the forces respectively exerted by the lead-in cables on the ends of the seismic cable. Each correction thus initiated comprises a command S30 of one or several setpoint pairs of forces to be exerted by the lead-in cables at each end of the seismic cable. Each setpoint pair of forces command in particular depends on the deviation value observed in S20 between the setpoint position and the corresponding respective actual position. In other words, as a function of the deviation observed in S20 and potentially other criteria, the method comprises the command S30 in the RAVs of a respective setpoint force (independent for each RAV) to be exerted on the seismic cable at the end of the seismic cable connected to the controlled RAV. The setpoint force may assume the form of a single value or a series of values, since to correct the deviation, a single force value for a given time or series of several different force values for this same given time may alternatively be implemented. Each RAV translates the setpoint into a propulsion of the RAV in the water, as mentioned above, to effectively exert a force on the end of the respective seismic cable, through the respective lead-in cable. This translation can be done through a control unit on board the RAV or a master vessel, for example the aforementioned control unit, or by any other means.

Thus, the method of FIG. 4 implements a feedback loop that uses, as input, a deviation observation between the actual position of the seismic cable and the setpoint position of the seismic cable, and commands, as output, a setpoint for forces to be exerted by each RAV on its respective seismic cable end. Any frequency of this feedback loop may be adopted. Various example embodiments are described below.

In the example of FIG. 4, the setpoint forces themselves are involved in a second feedback loop. Indeed, the adjustment of the forces depends on measurements S40 controlling the force actually exerted, including, in the example, the measurement S42 (for example, by a tensiometer) of the tension at the two ends of the seismic cable and the measurement S44 (for example, by a compass) of the direction of the seismic cable at least substantially at the two ends of the seismic cable. In other words, the RAVs each translate the setpoint force and actions to be performed (actuation of the propeller of the RAV in the water and/or winch actuation), and the method comprises tension S42 and direction S44 measurements, which respectively provide the intensity in the direction of the force vector actually exerted, to control said force vector actually exerted. Thus, the actions performed by the RAVs are adjusted according to the deviation observed between the actual force and setpoint force via a feedback loop, the feedback of which is shown by reference S45 in the figure. The deviation between the actual position and the setpoint position is therefore adjusted via a double feedback loop S20-S45.

The method of FIG. 4 therefore allows a feedback loop with feedback in the same location as the actuator, via a precise, fast and reliable measurement. This allows precise control of the position of the seismic cable, the best point to act being the cable end. The method of FIG. 4 makes it possible to do away with knowing the speed of the cable and therefore the need for acoustic positioning measurements (the GPS signal not being received underwater), i.e., triangulation with several known position points. The method of FIG. 4 thus reduces the delay on the feedback loop, for example related to communication with the other points (master boat or other RAVs) and the calculation. The absence of need for communication with other vessels accelerates the process, but also offsets the sensitivity of the feedback to failures or losses of radiocommunication (which may be more or less long). Furthermore, the positioning is more precise, compared to acoustic positioning, where non-negligible positioning errors may occur (sometimes around several meters). The measurement of the tension in the seismic cable may be a direct measurement. For the direction of the force, the method may use a compass in the seismic cable, which is also a direct measurement. The set of these two measurements constitutes precise, reliable and fast feedback. Furthermore, the method is easy to implement and validate and is relatively reliable, for example compared to a simultaneous control of the speed (v1, v2) of both RAVs, which could use hydrodynamic three-dimensional modeling of the cable and the lead-in cables (which would depend, inter alia, on the currents from the surface to the depth of the cables, knowing that the currents vary greatly depending on the layers of water). Given the stationary context, GPS-based speed control would be relatively unreliable, since GPS measurements are relatively imprecise and noisy at a zero speed (at a zero speed, GPS primarily measures movements of the RAV due to the waves: yaw, roll, pitch, sway, surging, heave).

As previously explained, the forces exerted by the RAVs on the seismic cable ends each, during the method, simultaneously have an axial component, substantially throughout the data acquisition. This makes it possible to maintain a tension in the cable. The autonomous nature of the exertion of each of the two forces by the RAVs also allows these two forces to have, each and simultaneously, at at least one moment of the correction of the horizontal position of the seismic cable, a lateral component relative to the seismic cable. Thus, the method allows a lateral movement of the seismic cable and/or a rotation of the seismic cable around itself, at least periodically, which allows a globally more precise and faster correction of the position.

For example, the method may perform such an adjustment of the forces (with simultaneous lateral component for both ends) under an instantaneous lateral movement speed constraint of the seismic cable relative to the water below 1 m/s, preferably below 0.5 m/s. In other words, the exerted forces may each have a lateral component simultaneously at certain moments of the method, but under the condition that these components respect such a lateral speed limit of the seismic cable in the water. This makes it possible to control the mechanical and energy constraints.

A detailed example of the method of FIG. 4 will now be described in reference to FIGS. 5-10.

In this example, the feedback loop of each setpoint pair of forces command (i.e., for each end of the seismic cable) receives a contribution of a set of several components of the corresponding respective horizontal deviation value. In other words, the deviation observed in S20 is broken down into several components that contribute independently to the output of the feedback loop, i.e., the setpoint pair of forces is a function of which these components are independent arguments. This allows a simple implementation of the method. This also allows flexibility of the method. Indeed, the contribution of each component to the setpoint pair of forces in the feedback loop can be adaptive, before and/or during the data acquisition. In other words, the parameters of the feedback loop for each component, for example the gains and/or the saturation filters, can adapt based on different criteria. They may for example be adjustable by a user and/or according to automated mechanisms.

The adaptation of the contribution of a component to the setpoint pair of forces in the feedback loop may for example depend on the value of the component, the determined and/or predicted value of the current, a maximum stress value, an energy minimization criterion, and/or any criterion defined by a user.

The set of several components may for example comprise an in-line component, a transverse component, a curvature component, and/or a direction component. It may for example consist of all of these four components. These four components are described in detail below in reference to the figures.

The method of the example allows dynamic positioning of a seismic cable during a seismic prospecting method in a water medium. The method of the example has high maneuverability of the system. The RAVs are not forced to tow alternately, and they are authorized to cause a lateral movement of the seismic cable. Movements accelerating the elimination of the deviation between (for example, the center of) the cable and the desired target point are authorized.

The method according to the example makes it possible to align the cable on a desired position by imposing constraints to minimize the error, for example, the central point and the variations of the azimuth of the cable. The management of these constraints may primarily be subject to environmental factors (e.g., current and/or obstacles. The method of the example makes it possible to maintain a minimum tension in the cable. The method of the example makes it possible to maintain a rectilinear shape of the cable. The method of the example makes it possible not to exceed a maximum imposed tension. The method of the example makes it possible to keep the center of an array of several cables stationary relative to a selected target point. This target point may be the center of the array or the center of the master cable. The method of the example allows the selected target point to vary over time. The device may be called upon to follow a desired trajectory. This trajectory may be the result of an optimization calculation comprising the direction and the amplitude of the current to minimize the forces supplied by the RAVs and facilitate the movement of the cable. In particular, this optimization may be important during transit from one acquisition zone to another, since the currents can be heterogeneous. The method according to the example makes it possible to automate a variable adjustment of the algorithm to effectively control the system in the presence of outside disruptions or modifications of the target point.

The method of the example is based on double feedback. Tension sensors and compasses are located at both ends of the seismic cable, which in turn is positioned at a depth. Likewise, tensiometers and compasses are positioned at points situated along the cable, the cable thus providing greater reliability to the measurement of the tension while providing information regarding the shape of the cable. The depth of the latter is selected according to the geographical zone of interest. The positioning algorithm calculates a force vector at each end of the cable. The two surface RAVs can use their propellers to exert the necessary thrust to ensure the required force vector at a depth.

This choice of double feedback offers various advantages. A first advantage relates to the precision of the tension at a depth. The noise from the measurement is thus attenuated, the presence of several tensiometers at a depth makes the data more reliable. A second advantage is related to a potential difference in the current between the surface and the desired depth. The seismic cable can be controlled in the environment in which it moves.

The seismic cable can be equipped with several compasses placed at constant intervals, and the RAVs can each have a satellite location system. Using data from the sensors as input and a developed positioning algorithm, the method may have, as output, the positions of the segments of the cable and thus obtain its exact shape below the water. The position data of the cable and the current position of the center of the cable can be sent to a control algorithm that provides, as output, the two force vectors to be applied to the ends of the cable.

As previously mentioned, the control algorithm to position the cable can be governed by the combination of four different forces making it possible to achieve the objectives.

In one example, these four forces that make up the command S30 are as follows:

Force 1: It compensates the error relative to the axis of the seismic cable (i.e., in-line component of the position deviation observed in S20). This axis is called the 'x' axis. Depending on the sign of the error, the method causes the cable to move forward or backward. To that end, the appropriate towing RAV is automatically selected, and the method assigns it a force component in the axis 'x'.

Force 2: It compensates the error relative to the axis perpendicular to the seismic cable (i.e., transverse component of the position deviation observed in S20). This axis is considered the 'y' axis. The error in this case also has a sign indicating the direction of the cable's lateral movement to said cable. To approach the target point, the two RAVs according to the method are towing RAVs and advance laterally with equal forces and a configurable angle, for example 45 degrees relative to the axis of the cable.

Force 3: It keeps the cable tensioned and thus compensates for a curve formation of the seismic cable (i.e., curvature component of the position deviation observed in S20). It is made up of a minimum tension selected by the operator and an additional tension proportional to the curve of the cable. The purpose of this force is to keep the cable straight and stretched. The two RAVs simultaneously pull in the axis of the cable with equal forces and in opposite directions.

Force 4: The purpose of this force is to provide a fixed heading to the cable and thus to compensate for a heading deviation of the cable (i.e., component toward the position deviation observed in S20). If only one target point is defined, the cable is free to rotate around itself. Otherwise, this force keeps the cable in the direction requested by the user. This is done through forces oriented for example at 45 degrees (or other configurable angle) relative to the direction of the cable and in opposite directions.

These four forces are respectively illustrated by FIGS. 5-8.

Figure 5:
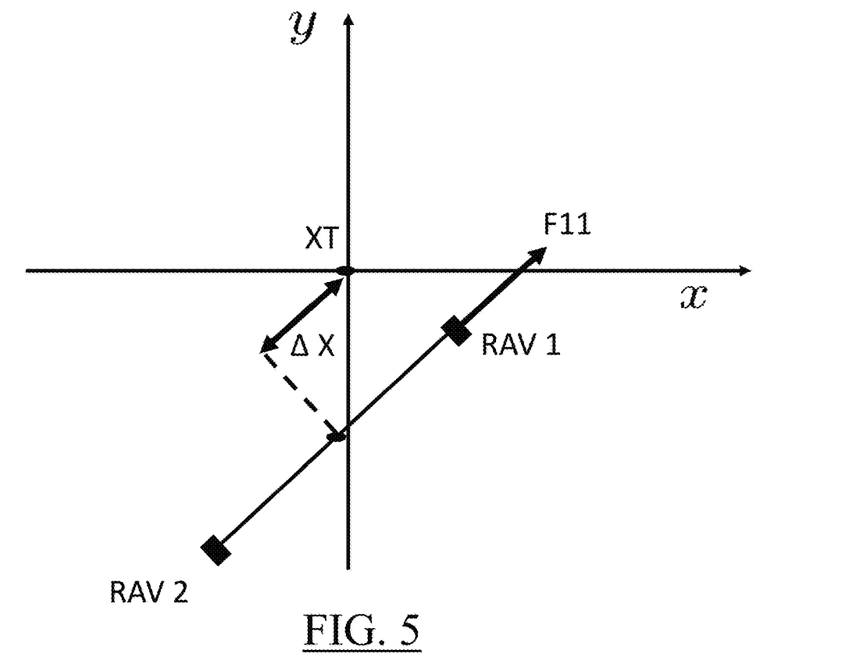
FIGS. 5-10 illustrate the example of the method.

FIG. 5 shows the force 1 along the 'x' axis. The target point is referenced 'XT', and the error to be compensated is referenced 'ΔX'. In the case of FIG. 5, for example, the RAV 1 can tow to cancel out this error as indicated by arrow F11 of the force. The direction of this force is that of the axis of the cable.

Figure 6:
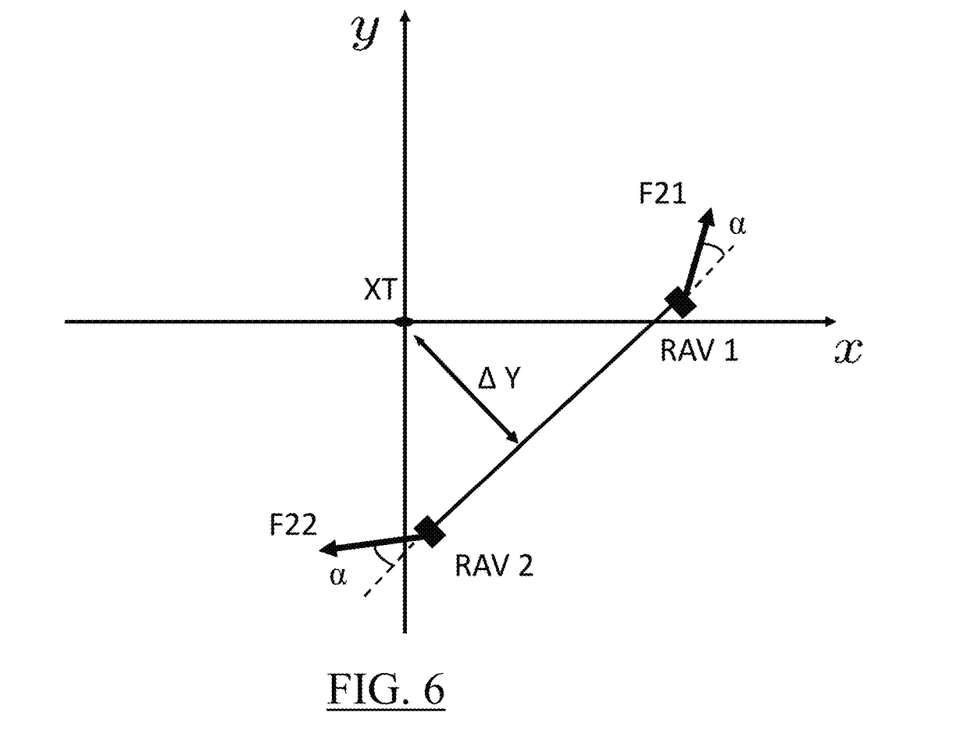

FIG. 6 shows the force 2 along the 'y' axis. The error to be compensated is referenced 'ΔY'. One can see both RAVs tow with equal forces in the direction of an angle α of the cable. This configurable angle, which may even be slaved, is visible in the figure. These forces allow the cable to move laterally to eliminate the error in question.

Figure 7:
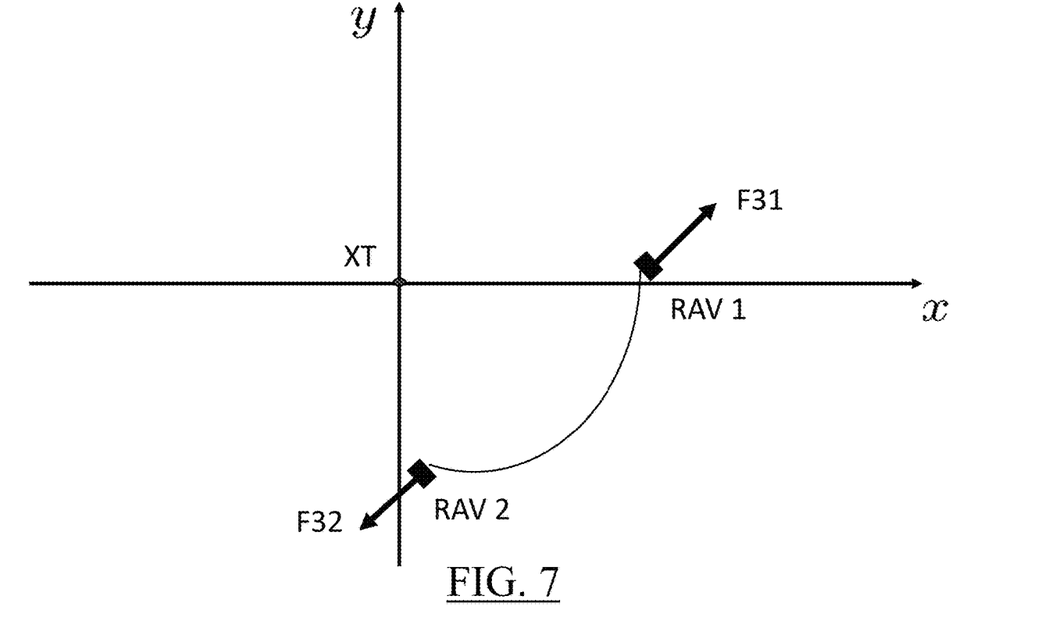

FIG. 7 shows the force 3. This force makes it possible to stretch the cable and maintain tension along the line. As indicated in the figure, the two RAVs pull in opposite directions to eliminate any curve in the cable. Like for the first case, the angle of the force is that of the axis of the cable.

Figure 8:
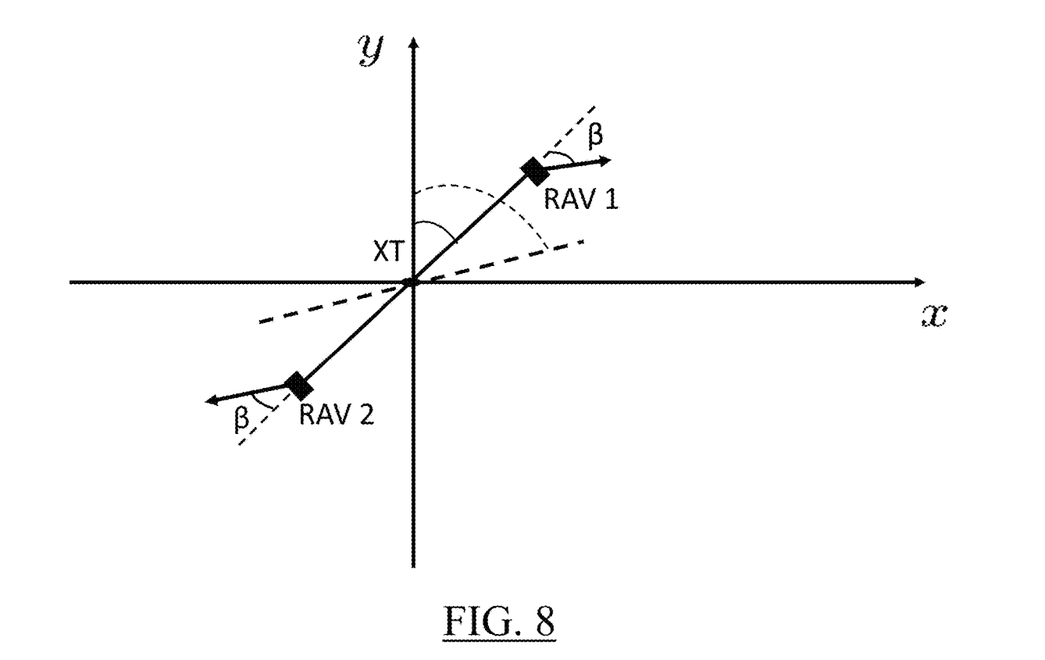

FIG. 8 shows the force 4 that corrects the orientation of the cable. The desired angle is shown in dotted lines. In this case, the cable must rotate clockwise. One can see that the RAVs pull with an angle β relative to the axis of the cable, but in opposite directions to ensure the proper rotation of the cable. This angle shown in the figure can also be configured or slaved.

Figure 9:
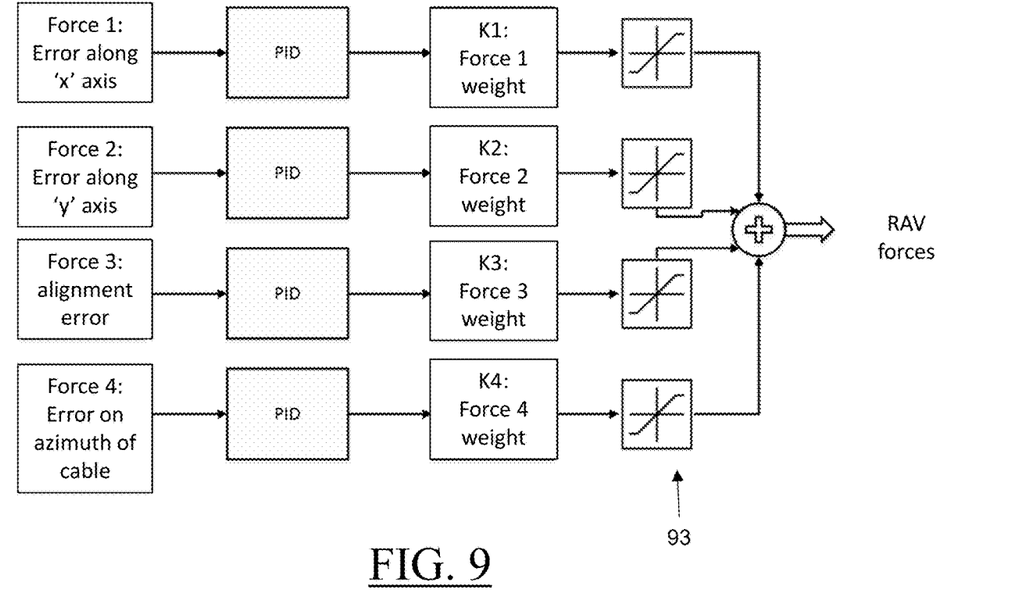
Figure 10:
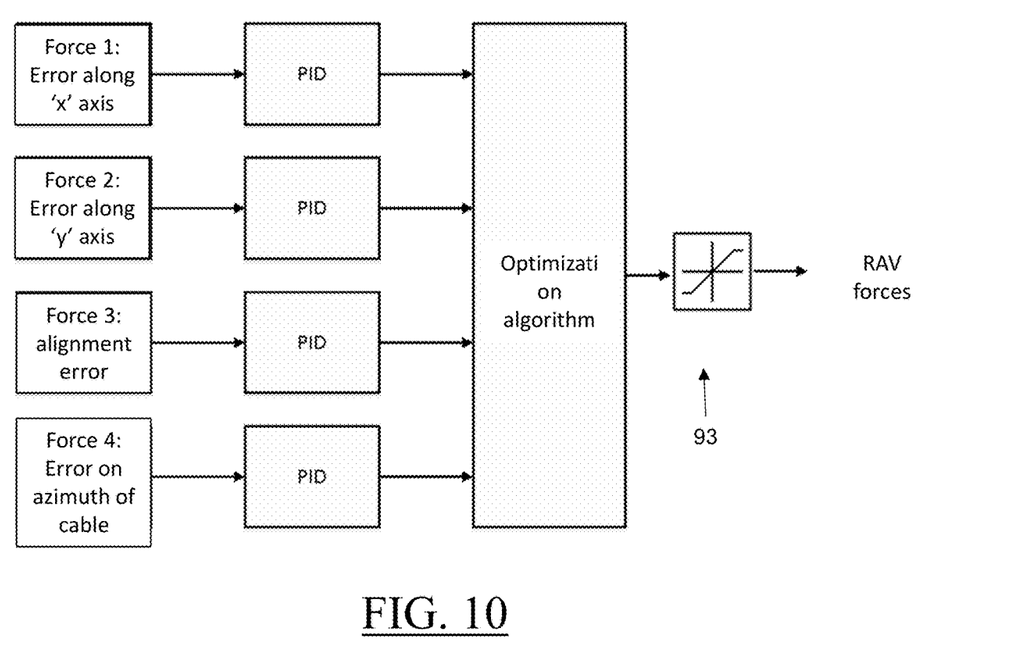

Different features of the feedback are now described in reference to FIGS. 9-10.

FIG. 9 shows the algorithm, specifying the errors and the calculation of each force component with weighting (for example, manual) to arrive at the final forces applied by the RAVs. FIG. 10 shows the algorithm while integrating an automatic mode for the adjustment of the weight of the coefficients of the force components. In both cases, the feedback implements one or several saturation filters 93, to avoid excessive mechanical stresses.

Each of the forces described above is independent and converges at the setpoint by itself. The calculated errors from which these forces follow are separate, which allows each force to have its own evolution and contribution. Four feedback loops of the PID (Proportional, Integral, Derivative) type act individually on the errors in question to yield the four components that make up the final force vector.

The gains within each PID loop can be of adaptive type. This for example makes it possible to have a higher gain when the error is low, and a lower gain otherwise. This adaptation of the gain can prevail in many situations, such as the tidal current. Indeed, when the device is forced to move parallel to the current, it may be wiser to allow it to be carried by oscillating to and fro movements than to fight the current by demanding considerable efforts from the RAVs. If the cables move gradually further away from the target point in the case of the tide, the stress in the 'y' axis does not reach excessively high values, given that the gain is increasingly small. It is also possible to saturate each force (with the filters 93) to ensure that the desired limit of the stresses to be supplied is never exceeded.

The calculation of these four forces may be done at regular time intervals. The four forces are next added together, and the method thus results in a single force and direction to be applied to each end of the cable. Each force may have a different weight at any time, for example if the operator wishes to cancel out one determined error instead of another.

This example of the method involves manual weighting for each of the force components. This adjustment of the contributions of the forces to be generated can also be the result of an optimization on a desired predetermined criterion. The gains in question can be selected automatically to minimize the expended energy, for example, or the error on an axis or a desired direction.

The automatic adjustment of the coefficients of the forces as well as the adjustment of the PIDs (manual mode or automatic mode, real-time adjustment) add flexibility to the control of the system's behavior. Depending on the adjustment that is done, the cable may for example either oscillate around a central point or offset itself in parallel. Its adjustment may be adapted and may depend on:
- characteristics of the zone, in particular the current profile (presence of circular tidal currents, presence of predominant currents, and/or other types of currents);
- the deployed device (length of the cables, number of cables, desired depth); and/or
- the purpose of the study and the user's requirements (azimuth oscillations accepted, parallel offset accepted).

The adjustment of the forces outlined above may be related to the outside disruption consisting of the current. For example, with knowledge of the current, the desired position of the central point can be calculated as a function of the predictions. The method may, in one example, calculate the integral of the current factor with a spatial phase shift equal to half of the length of the cable.

The current knowledge may be obtained through different methods, for example:
 a) Current meters, providing a local measurement.
 b) Current prediction software and models.
 c) The shape of the cable deformed by the current.
 d) A hydrodynamic simulator with the position data of the cable and forces as input.
 e) A combination of the above methods.

Option a) provides real-time information, but remains a local datum related to the measuring point. Its reliability is related to the noise and reliability of the sensor. Option b) is a forecast that is less reliable than the measurement, but that has the advantage of providing information on the entire zone by providing an indication on the future current. The shape of the cable and the forces applied to its ends make it possible to deduce the direction and intensity of the current. For example, a substantial deflection and without perpendicular forces applied to the cable makes it possible to explain a substantial transverse current. Option d) is also an estimate of the current by using a hydrodynamic model of the cable. The actual behavior of the cable (position, speed, acceleration, curve) is compared to its simulated behavior, incorporating the applied forces. The deviation between reality and the simulation makes it possible to deduce the force of the current induced on the cable. Option e) is a combination of the above methods. The prediction of the marine currents can be refined by the local measurements done in the field. Indeed, the oceanographic models predict the currents in a zone by using the local bathymetry as well as past wind and tide data to calibrate a stable model in the studied zone. This model can be corrected by using local measurements. The amplitude of the current could be recalibrated, and some parameters could be adjusted, such as the significance of the tide in the zone.

The described algorithm considers that the two RAVs react in the same way to each of the force components. Conversely, it should be noted that different roles may be assigned to each of the RAVs. For example, the RAV facing the current may be considered the head RAV, and the second may be considered the tail RAV. If there is a need to position oneself in the direction of a stable current, the head RAV may have a high Force 2 (force along the 'y' axis), while the tail RAV may reposition itself automatically via the current with no additional forces.

As previously indicated, the method generally comprises one or several cables. If the device at sea is made up of a single cable, the control with four forces may be assigned to it. If several cables are present, in one example, a single cable is chosen as master cable. Nominally, the master cable may be that which is at the center of the array, but this function may be assigned to any one. The algorithm with the four forces may for example be applied solely to the master cable, while the others, considered slave cables, may be tasked with remaining parallel while keeping a fixed distance from one another. This distance can be determined by the operator.

Thus, the control of the position of the cable according to the invention is done through double feedback. A force vector is defined at the end of the cable, and control regarding the thrust of the RAVs is done to ensure the desired force at a depth. A single force vector is calculated at each end to compensate the positioning errors while maintaining tension in the cable, its rectilinear shape, and a favored direction. Each RAV is independent and autonomous and is assigned a different force vector.

One force component may act to compensate the error in the axis of the cable. One force component acts to compensate the error in the axis perpendicular to the cable. One force component acts to maintain tension in the cable and ensure the rectilinear shape thereof. One force component acts to maintain a constant heading of the cable.

The heading of the cable can be chosen by the operator and can be modified during operation at any time. The target point can be chosen by the operator and can be modified during operation at any time. This target point may be the center of the float or the center of the master cable. A weight may be assigned to each force at each moment to favor the cancellation of one error relative to another.

The calculation of the forces of the algorithm may be such that the gains are adaptive and the weight coefficients of the forces are calculated automatically according to optimization criteria.

The control of the array may be done by having a master cable and the other cables as slaves keeping a fixed distance relative to their neighbors. The array may follow a desired trajectory by receiving a different target point at each moment. The slave cables may continuously maintain fixed spacing between them. This mode may be called "progressive mode".

The desired position of the central point may be calculated according to predictions by calculating the integral of the current factor with a spatial phase shift equal to half of the length of the cable.

The marine current may be estimated through the shape of the cable and the forces applied to its ends.

The marine current may be estimated by using a hydrodynamic model of the cable. The deviation between reality and the simulation makes it possible to deduce the force of the current induced on the cable.

The marine current may be estimated by combining several methods: the oceanographic models for predicting currents can be recalibrated with the local measurements and validated by the shape of the cable and the estimated current from the hydrodynamic simulator.

Figure 11:
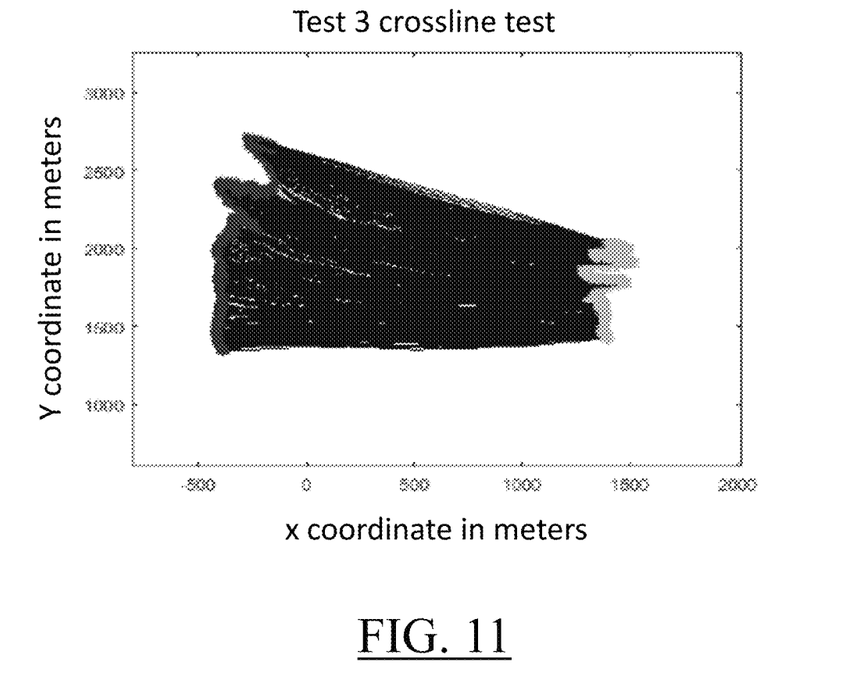
FIG. 11 shows the result of a test.

Tests relative to the lateral movement of each seismic cable via the described method have been carried out, and one of them is now described in reference to FIG. 11.

The test has been carried out in the progressive mode with a cable measuring 1.75 km, for about two hours, and at an approximate speed of 0.15 m/s. The results are shown in FIG. 11. The center of the cable has been moved by 1 km during the two hours (from left to right in the figure). Other tests have shown that a movement of 400 m in 15 minutes is possible.

Thus, the tests have demonstrated the feasibility of the method, and in particular that the lateral movement can be used to accelerate the horizontal positioning and make it more precise.

The invention claimed is:

1. A method for controlling the horizontal position of a seismic cable having a neutral buoyancy and adapted for acquiring seismic data midwater, each end of the seismic cable being connected to a respective autonomous surface vessel that exerts a force on said end, such that the seismic cable can be kept stationary or quasi-stationary midwater during the data acquisition through application of forces in opposite directions by the surface vessels on the ends of the cable to which they are respectively connected, the seismic cable being connected to the surface vessels via a respective negative buoyancy lead-in cable, the method comprising, based on a deviation observed between the position of the seismic cable and a setpoint horizontal position, a correction of the position of the seismic cable through an adjustment of the forces respectively exerted by the lead-in cables on the ends of the seismic cable, the exerted forces simultaneously and each having an axial component and a lateral component relative to the seismic cable at at least one moment of the correction, the adjustment of the forces depending on at least one measurement of the tension at the two ends of the seismic cable and the direction of the seismic cable at least substantially at the two ends of the seismic cable, the exerted forces being adjustable to produce a lateral movement of the seismic cable.

2. The method according to claim 1, wherein the deviation observed between the position of the seismic cable and the setpoint horizontal position comprises a series of one or several deviation values, the adjustment of the forces comprising a series of commands of one or several setpoint pairs of forces to be exerted respectively by the lead-in cables on the ends of the seismic cable, each setpoint pair of forces command depending on a corresponding respective deviation value.

3. The method according to claim 2, wherein each setpoint pair of forces command comprises a feedback loop using, as input, at least one measurement of the tension at the two ends of the seismic cable and the direction of the seismic cable at least substantially at the two ends of the seismic cable.

4. The method according to claim 3, wherein the tension measurement is provided by a tensiometer and/or the measurement of the direction of the seismic cable is provided by a compass.

5. The method according to claim 3, wherein the feedback loop of each setpoint pair of forces command receives a contribution of a set of several components of the corresponding respective deviation value, the contribution of a component of the set being independent of the contributions of the other components.

6. The method according to claim 5, wherein the set of several components comprises an in-line component, a transverse component, a curvature component, and a direction component.

7. The method according to claim 5, wherein the contribution of each component to the setpoint pair of forces in the feedback loop is adaptive.

8. The method according to claim 7, wherein the adaptation of the contribution of a component to the setpoint pair of forces in the feedback loop depends on the value of the component, the determined and/or predicted value of the current, a maximum stress value, an energy minimization criterion, and/or a criterion defined by a user.

9. The method according to claim 1, wherein the seismic cable is comprised in a array of seismic cables having a neutral buoyancy and adapted for acquiring seismic data midwater, each end of each seismic cable being connected to a respective autonomous surface vessel that exerts a force on said end, such that the seismic cable can be kept stationary or quasi-stationary midwater during the data acquisition, the seismic cable being connected to the surface vessels via a respective negative buoyancy lead-in cable, the method further used for controlling the horizontal position of the array.

10. The method according to claim 9, wherein the method comprises controlling the horizontal position of at least one other seismic cable of the array by maintaining a fixed distance relative to the at least one of the seismic cables of the array.

11. A device including a non-transitory readable storage medium having recorded thereon a program which comprises program code instructions for executing steps of a method for controlling the horizontal position of a seismic cable having a neutral buoyancy and adapted for acquiring seismic data midwater, each end of the seismic cable being connected to a respective autonomous surface vessel that exerts a force on said end, such that the seismic cable can be kept stationary or quasi-stationary midwater during the data acquisition through application of forces in opposite directions by the surface vessels on the ends of the cable to which they are respectively connected, the seismic cable being connected to the surface vessels via a respective negative buoyancy lead-in cable, the method comprising, based on a deviation observed between the position of the seismic cable and a setpoint horizontal position, a correction of the position of the seismic cable through an adjustment of the forces respectively exerted by the lead-in cables on the ends of the seismic cable, the exerted forces simultaneously and each having an axial component and a lateral component relative to the seismic cable at at least one moment of the correction, the adjustment of the forces depending on at least one measurement of the tension at the two ends of the seismic cable and the direction of the seismic cable at least substantially at the two ends of the seismic cable, the exerted forces being adjustable to produce a lateral movement of the seismic cable.

12. The device according to claim 11, further including a control unit, the control unit comprising a processor in communication with the data storage medium and able to run the program.

13. A system comprising a seismic cable having a neutral buoyancy and adapted for acquiring seismic data midwater, each end of the seismic cable being adapted for being connected to a respective autonomous surface vessel that exerts a force on said end, such that the seismic cable can be kept stationary or quasi-stationary midwater during the data acquisition, the seismic cable being connected to the surface vessels via a respective negative buoyancy lead-in cable, the system being configured to control the horizontal position of the seismic cable using a method comprising, based on a deviation observed between the position of the seismic cable and a setpoint horizontal position, a correction of the position of the seismic cable through an adjustment of the forces respectively exerted by the lead-in cables on the ends of the seismic cable, the exerted forces simultaneously and each having an axial component and a lateral component relative to the seismic cable at at least one moment of the correction, the adjustment of the forces depending on at least one measurement of the tension at the two ends of the seismic cable and the direction of the seismic cable at least substantially at the two ends of the seismic cable, the exerted forces being adjustable to produce a lateral movement of the seismic cable.

14. The system according to claim 13, further comprising a tensiometer and/or a compass at each end of the seismic cable.

15. The system according to claim 13, further comprising at least one other seismic cable having a neutral buoyancy and adapted for acquiring seismic data midwater, the system forming a seismic cable float.

\* \* \* \* \*